United States Patent Office 2,854,378
Patented Sept. 30, 1958

2,854,378
TETRACYCLINE SUPPOSITORY

Frank H. Buckwalter, De Witt, N. Y., assignor to Bristol Laboratories Inc., Syracuse, N. Y., a corporation of New York No Drawing. Application December 8, 1955
Serial No. 551,731

6 Claims. (Cl. 167—64)

This invention relates to improved therapeutic suppositories for rectal and vaginal use and, more particularly, to suppositories containing a mixture of a therapeutic agent, e. g. a form of tetracycline, and a condensation product having a molecular weight greater than 7500 of ethylene oxide with a condensation product of propylene oxide with propylene glycol.

It is the object of the present invention to provide a non-toxic therapeutic suppository which is suitable for use in tropical countries (i. e. does not melt below 50° C.), whose base is entirely soluble in water and, indeed, dissolves rapidly to form a solution or suspension of the therapeutic agent of low surface tension; and which contains no elements capable of combining with, precipitating, destroying or inactivating the therapeutic agent, e. g. after the manner of anionic and cationic wetting agents, either during manufacture, during storage or during use.

The objects of this invention have been achieved by the provision, according to the present invention, of a stable non-toxic, therapeutic suppository which remains solid when stored below 50° C. comprising a therapeutic agent and a water-soluble condensation product, having a molecular weight greater than 7500, of ethylene oxide with a condensation product of propylene oxide with propylene glycol.

There is provided as a more particular embodiment of the present invention, a stable, non-toxic, therapeutically useful tetracycline suppository which remains solid when stored below 50° C. comprising one part by weight of a form of tetracycline and at least ten parts by weight of a water-soluble condensation product, having a molecular weight greater than 7500, of ethylene oxide with a condensation product of propylene oxide with propylene glycol.

The phrase "a form of tetracycline" as used herein includes the amphoteric base, both hydrated and anhydrous, non-toxic acid addition salts, such as the hydrochloride, amine salts and non-toxic metal salts, such as calcium tetracycline, including complexes and chelates. Use may be made in the products of the present invention of preservatives, buffering agents, color-stabilizing agents (e. g. from 0.001 to 0.5 percent, and preferably 0.01 to 0.20 percent, of a non-toxic compound providing bisulfite ion or metabisulfite ion or ascorbic acid) and the like if desired, but this is not essential.

The phrase "therapeutic agent" as used herein includes antibiotics, e. g. streptomycin, dihydrostreptomycin, neomycin, bacitracin, polymixin, tyrothricin, erythromycin, tetracycline, chlortetracycline, bromotetracycline, oxytetracycline, chloramphenicol, magnamycin, carbomycin, amphomycin, etamycin, thiostreptone, and penicillin including salts of penicillin such as potassium penicillin G, procaine penicillin G, 1-ephenamine penicillin G, dibenzylamine penicillin G, N,N'-dehydroabietyl-ethylene-diamine bis-penicillin G, N-benzyl-beta-phenethylamine penicillin G and dehydroabietylamine penicillin G, antiseptics, germicides, contraceptive agents, nitrofurazone, furazolidone, sulfa drugs (e. g. sulfadiazine, sulfamerazine, sulfamethazine, sulfabenzamide, sulfacetamide, sulfanilamide, sulfapyridine, sulfathiazole, sulfapyrazine, sulfaguanidine, sulfathalidine, sulfasuxidine, sulfisoxazole, sulfamylon, phthalylsulfacetamide, N'-3,4 dimethylbenzoylsulfanilamide, benzylsulfanilamide and N'-(2-quinoxalyl)-sulfanilamide), antifungal agents such as mycostatin, and the polyene agents such as cadicidin, filipin and ascosin and agents derived from *Streptomyces aureofaciens*, hormones such as adrenocorticotropic hormone, cortisone and cortisone-like compounds, depressants of the central nervous system such as barbiturates, aminophyllin, local anesthetics, antihistamines, tranquilizing agents such as chlorpromazine and reserpine and the like, stimulants of the central nervous system such as the amphetamines and analgesics, e. g. narcotics like morphine. Multiple combinations of such therapeutic agents are often useful.

It has been found that a highly satisfactory suppository of the character indicated can be formed by the use of certain Pluronics as an ingredient. The Pluronics are a series of non-ionic surface-active agents, prepared by condensing ethylene oxide with a hydrophobic base formed by the condensation of propylene oxide with propylene glycol. The series are represented empirically by the formula:

$$HO(C_2H_4O)_a(C_3H_6O)_b(C_2H_4O)_cH$$

where $a$, $b$ and $c$ are integers chosen to give molecular weights of from about 2000 (for Pluronic L62) to above 7500 (for Pluronic F68). Pluronic F68 is a tasteless solid of low hygroscopicity and high water solubility, showing no cloud point in distilled water even at the boiling point, melting at about 51–54° C., and being soluble in water in all proportions and soluble to the extent of greater than 10% in acetone, carbon tetrachloride, ethanol and toluene; it is made available by the Wyandotte Chemicals Corp., Wyandotte, Michigan. These compounds are further described by the Pacifico et al. in Soap and Sanitary Chemicals, pages 1–6, October 1950. The $LD_{50}$ for Pluronic F68 orally in mice is greater than 15 grams per kilogram of body weight; oral administration of Pluronic F68 has been found to produce no appreciable toxic effects on the blood elements in rats and dogs or on the visceral organs of rats. Pluronic F68 has been found to be non-hemolytic in man.

Further understanding of this invention may be obtained by reference to the following examples which are illustrative only and are not the exclusive embodiment of the invention.

Example I

Three lots of fifty suppositories each were prepared from the following, tabulated materials:

| Material | Amount in Grams | | |
|---|---|---|---|
| | Lot 1 | Lot 2 | Lot 3 |
| Tetracycline Hydrochloride, Micronized | 5.0 | 5.0 | 5.0 |
| Methyl Paraben | | 10.0 | 10.0 |
| Propyl Paraben | | 2.5 | 2.5 |
| Pluronic F68 | 115.0 | 102.5 | 102.3 | by melting the Pluronic F68, mixing therein at 55° C. the other dry material, pouring the melt into a mold, allowing the mixture to solidify and then removing the suppositories.

Example II

A batch of 144 suppositories was prepared from the following materials:

|   | G. |
|---|---|
| Micronized tetracycline hydrochloride | 14.4 |
| Methyl Paraben | 28.8 |
| Propyl Paraben | 7.2 |
| Sodium bisulfite | 0.56 |
| Pluronic F68 | 242.8 |

The Pluronic F68 was melted at about 85° C. After cooling to about 70°–75° C., the Parabens, sodium bisulfite and tetracycline hydrochloride were added in that order with stirring. The mixture was kept warm (at least 70° C.) for a few minutes and then poured into a mold, chilled and allowed to set for several hours. The finished suppositories were then removed.

Example III

Pluronic F68 (279.4 g.) was melted at 85° C. and cooled to 70° C., whereupon 14.4 g. micronized tetracycline hydrochloride was added and mixed well with the liquid Pluronic F68. The liquid mixture at 65°–70° C. was then poured into molds. After chilling for several hours, the finished suppositories were removed from the mold.

Example IV

Three lots of fifty suppositories each are prepared from the following, tabulated materials:

| Material | Amount in Grams | | |
|---|---|---|---|
| | Lot 1 | Lot 2 | Lot 3 |
| Chlortetracycline Hydrochloride | 5.0 | 5.0 | 5.0 |
| Methyl Paraben | | 10.0 | 10.0 |
| Propyl Paraben | | 2.5 | 2.5 |
| Pluronic F68 | 115.0 | 102.5 | 102.3 | by melting the Pluronic F68, mixing therein at 55° C. the other dry material, pouring the melt into a mold, allowing the mixture to solidify and then removing the suppositories.

Example V

Three lots of fifty suppositories each are prepared from the following, tabulated materials:

| Material | Amount in Grams | | |
|---|---|---|---|
| | Lot 1 | Lot 2 | Lot 3 |
| Oxytetracycline | 5.0 | 5.0 | 5.0 |
| Methyl Paraben | | 10.0 | 10.0 |
| Propyl Paraben | | 2.5 | 2.5 |
| Pluronic F68 | 115.0 | 102.5 | 102.3 | by melting the Pluronic F68, mixing therein at 55° C. the other dry material, pouring the melt into a mold, allowing the mixture to solidify and then removing the suppositories.

Example VI

Three lots of fifty suppositories each are prepared from the following, tabulated materials:

| Material | Amount in Grams | | |
|---|---|---|---|
| | Lot 1 | Lot 2 | Lot 3 |
| Chloramphenicol | 5.0 | 5.0 | 5.0 |
| Methyl Paraben | | 10.0 | 10.0 |
| Propyl Paraben | | 2.5 | 2.5 |
| Pluronic F68 | 115.0 | 102.5 | 102.3 | by melting the Pluronic F68, mixing therein at 55° C. the other dry material, pouring the melt into a mold, allowing the mixture to solidify and then removing the suppositories.

Example VII

Three lots of fifty suppositories each are prepared from the following, tabulated materials:

| Material | Amount in Grams | | |
|---|---|---|---|
| | Lot 1 | Lot 2 | Lot 3 |
| Candicidin | 5.0 | 5.0 | 5.0 |
| Methyl Paraben | | 10.0 | 10.0 |
| Propyl Paraben | | 2.5 | 2.5 |
| Pluronic F68 | 115.0 | 102.5 | 102.3 | by melting the Pluronic F68, mixing therein at 55° C. the other dry material, pouring the melt into a mold, allowing the mixture to solidify and then removing the suppositories.

The compositions are not limited to the exact ingredients previously described and to the exclusion of all others, since various other ingredients, while not necessary, may be added if desired. For instance, a small amount of preservative, such as phenol U. S. P., cresol U. S. P., methyl Paraben (methyl ester of p-hydroxybenzoic acid), ethyl Paraben (ethyl ester of p-hydroxybenzoic acid), butyl Paraben (butyl ester of p-hydroxybenzoic acid) or propyl Paraben (propyl ester of p-hydroxybenzoic acid) may be employed.

It will be understood that, without departing from the spirit of the invention or the scope of the claims, various modifications may be made in the specific formulations described. The latter are illustrative only and are not offered in a restrictive sense, and there is no intention of excluding any equivalents of the features shown and described or portions thereof.

I claim:

1. A stable, non-toxic, therapeutically useful tetracycline suppository which remains solid when stored below 50° C. comprising a form of tetracycline selected from the group consisting of tetracycline, hydrates thereof, non-toxic metal salts thereof and non-toxic acid addition salts thereof and a water-soluble condensation product, having a molecular weight greater than 7500, of ethylene oxide with a condensation product of propylene oxide with propylene glycol, said condensation product being soluble in water in all proportions and melting at about 51–54° C.

2. A stable, non-toxic, therapeutically useful tetracycline suppository which remains solid when stored below 50° C. comprising one part by weight of a form of tetracycline selected from the group consisting of tetracycline, hydrates thereof, non-toxic metal salts thereof and non-toxic acid addition salts thereof and at least ten parts by weight of a water-soluble condensation product, having a molecular weight greater than 7500, of ethylene oxide with a condensation product of propylene oxide with propylene glycol, said condensation product being soluble in water in all proportions and melting at about 51–54° C.

3. A stable, non-toxic, therapeutically useful tetracycline suppository which remains solid when stored below 50° C. comprising tetracycline hydrochloride and a water-soluble condensation product, having a molecular weight greater than 7500, of ethylene oxide with a condensation product of propylene oxide with propylene glycol, said condensation product being soluble in water in all proportions and melting at about 51–54° C.

4. A stable, non-toxic, therapeutically useful tetracycline suppository which remains solid when stored below 50° C. comprising one part by weight of tetracycline hydrochloride and at least ten parts by weight of a water-soluble condensation product, having a molecular weight greater than 7500, of ethylene oxide with a condensation product of propylene oxide with propylene glycol, said condensation product being soluble in water in all proportions and melting at about 51–54° C.

5. A stable, non-toxic, therapeutically useful tetracycline suppository which remains solid when stored below 50° C. comprising amphoteric tetracycline and a water-soluble condensation product, having a molecular weight greater than 7500, of ethylene oxide with a condensation product of propylene oxide with propylene glycol, said condensation product being soluble in water in all proportions and melting at about 51–54° C.

6. A stable, non-toxic, therapeutically useful tetracycline suppository which remains solid when stored below 50° C. comprising one part by weight of amphoteric tetracycline and at least ten parts by weight of a water-soluble condensation product, having a molecular weight greater than 7500, of ethylene oxide with a condensation product of propylene oxide with propylene glycol, said condensation product being soluble in water in all proportions and melting at about 51–54° C.

References Cited in the file of this patent

UNITED STATES PATENTS

| | | |
|---|---|---|
| 2,677,700 | Jackson | May 4, 1954 |
| 2,730,483 | Mast | Jan. 10, 1956 |
| 2,749,230 | Kaplan | June 5, 1956 |

OTHER REFERENCES

Gross et al.: "Study of Suppository Bases," J. A. Ph. A., Sci. Ed., February 1953, pp. 90–95, esp. p. 93.

Hassler et al.: "Formulation of Water-Soluble Suppository Base," J. A. Ph. A., Prac. Pharm. Ed., January 1953, pp. 26, 27 and 54, esp. p. 27.

Gillham: "New Suppository Base," The Pharmaceutical Jour., June 25, 1949, esp. at p. 472.

Pluronics, brochure dated Mar. 1, 1952, pp. 1–5, 7, 9–13.